United States Patent
Kesterson et al.

(10) Patent No.: US 7,563,060 B2
(45) Date of Patent: Jul. 21, 2009

(54) VACUUM DRILLING SYSTEM

(75) Inventors: Matthew G Kesterson, Everett, WA (US); James A DeLand, Bothell, WA (US)

(73) Assignee: The Boeing Company, Chicago, IL (US)

( * ) Notice: Subject to any disclaimer, the term of this patent is extended or adjusted under 35 U.S.C. 154(b) by 471 days.

(21) Appl. No.: 11/163,293

(22) Filed: Oct. 13, 2005

(65) Prior Publication Data

US 2007/0086867 A1 Apr. 19, 2007

(51) Int. Cl.
*B23B 47/34* (2006.01)

(52) U.S. Cl. .............. 408/67; 480/58; 480/97; 480/207; 175/213; 175/324

(58) Field of Classification Search .............. 408/56, 408/58, 57, 60–61, 67, 72 R, 95, 97, 207, 408/703, 227, 230, 229; 175/213, 324; *B23B 47/34; B23Q 11/00*
See application file for complete search history.

(56) References Cited

U.S. PATENT DOCUMENTS

| | | | |
|---|---|---|---|
| 994,430 A | 6/1911 | Tunks | |
| 2,028,580 A * | 1/1936 | Yedd | 175/317 |
| 2,708,852 A * | 5/1955 | Wohlfahrt | 408/59 |
| 2,895,355 A * | 7/1959 | Kleine | 408/59 |
| 3,022,840 A * | 2/1962 | Hohos et al. | 175/324 |
| 3,032,129 A | 5/1962 | Fletcher et al. | |
| 3,085,453 A * | 4/1963 | Mossberg | 76/108.1 |
| 3,089,552 A | 5/1963 | Black et al. | |
| 3,144,912 A | 8/1964 | Boehm et al. | |
| 3,307,243 A * | 3/1967 | Andreasson | 407/11 |
| 3,555,937 A * | 1/1971 | Nicodemas | 408/59 |
| 3,694,099 A * | 9/1972 | Nicholas | 408/58 |
| 4,097,176 A | 6/1978 | Wanner et al. | |
| 4,190,128 A * | 2/1980 | Emmerich | 175/420.1 |
| 4,209,069 A | 6/1980 | Smith | |
| 4,313,506 A | 2/1982 | O'Connell | |
| 4,330,044 A | 5/1982 | Orr et al. | |
| 4,368,789 A | 1/1983 | Orr et al. | |
| 4,515,230 A * | 5/1985 | Means et al. | 175/420.1 |
| 4,605,079 A | 8/1986 | Leibee et al. | |
| 4,625,593 A * | 12/1986 | Schmotzer | 76/108.6 |
| 4,627,503 A | 12/1986 | Horton | |
| 4,628,584 A | 12/1986 | Clark et al. | |

(Continued)

FOREIGN PATENT DOCUMENTS

DE 3143847 A1 * 5/1983

OTHER PUBLICATIONS

EWS & Co. A.S., Dust Hog 1 1/2 inch drill bit website, Copyright 2000-2004, 2 pages.

*Primary Examiner*—Daniel W Howell
(74) *Attorney, Agent, or Firm*—Yee & Associates, P.C.; Brett L. Halperin

(57) ABSTRACT

An improved vacuum drilling system and drill bit includes a generally hollow vacuum drill bit with one or more chip inlets arranged proximate to one or more cutting surfaces. The drill bit also includes grooves along its exterior. When the drill bit is guided by a bushing or guide hole, the grooves serve to reduce the friction therebetween. The grooves can also convey air for cooling and improved chip collection.

20 Claims, 2 Drawing Sheets

U.S. PATENT DOCUMENTS

| | | |
|---|---|---|
| 4,711,312 A | 12/1987 | Leibee et al. |
| 4,711,609 A | 12/1987 | Seefluth |
| 4,964,476 A * | 10/1990 | Fischer ............... 175/213 |
| 5,033,917 A | 7/1991 | McGlasson et al. |
| 5,378,091 A * | 1/1995 | Nakamura ............ 409/132 |
| 5,451,126 A * | 9/1995 | Brun ..................... 408/1 R |
| 5,452,628 A | 9/1995 | Montgomery, Jr. et al. |
| 5,478,176 A | 12/1995 | Stedt et al. |
| 5,487,630 A * | 1/1996 | Campian ............... 409/225 |
| 5,630,682 A | 5/1997 | Davey |
| 5,904,453 A | 5/1999 | Gavia |
| 6,086,292 A | 7/2000 | Yokoyama |
| 6,595,305 B1 | 7/2003 | Dunn et al. |
| 2003/0170082 A1 | 9/2003 | Garcia et al. |

* cited by examiner

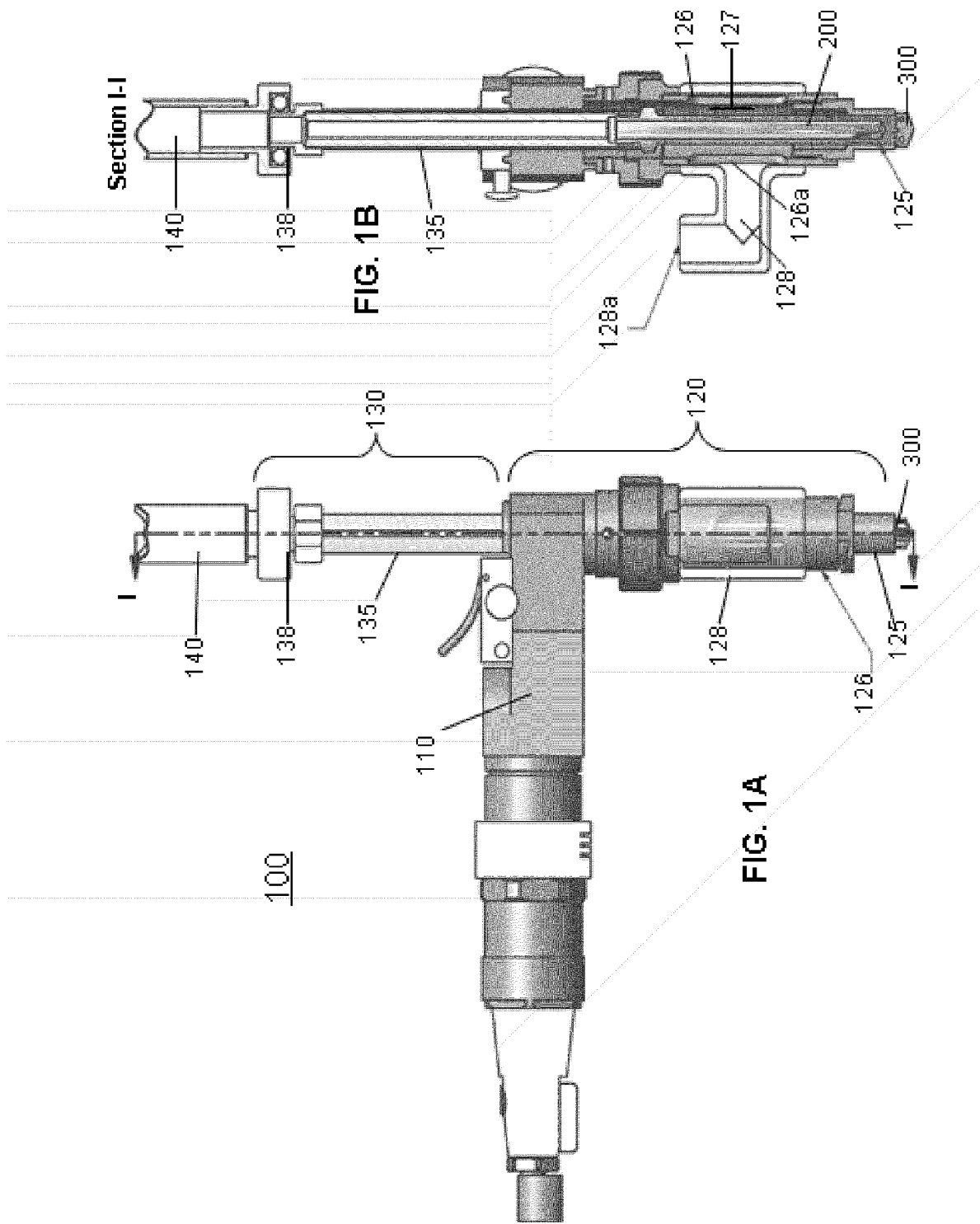

VACUUM DRILLING SYSTEM

FIELD OF THE INVENTION

The present invention relates to the field of drilling, and in particular, to vacuum drilling systems, which provide for the collection of chips generated by the drilling process.

BACKGROUND INFORMATION

The drilling of various materials often generates chips which, unless conveyed away from the cutting features of the drill bit, can impede the drilling process. Certain materials, including composite materials such as carbon fiber reinforced plastic (CFRP), for example, are notorious for yielding large quantities of fine chips when drilled. Without effective removal of the chips thus generated, chip compaction often occurs, reducing the drill's ability to cut, increasing the generation of heat, and reducing the life of the drill. It is not uncommon for drill bits to be discarded after drilling only five holes or less in materials such as CFRPs.

Several arrangements for removing drill chips have been developed, including vacuum drilling systems, for example. In a typical vacuum drilling system, a generally hollow drill bit is employed having one or more openings located proximate to the cutting features of the drill bit, which openings are in communication with the hollow interior of the drill. A vacuum source is coupled to the hollow interior of the drill bit so that chips generated by the cutting features of the drill bit are drawn through the openings and through the hollow interior of the drill bit away from the cutting features of the drill. Examples of such arrangements are described in U.S. Pat. Nos. 3,032,129, 3,144,912, and 6,086,292.

In addition to requiring effective chip removal, many drilling applications also require precision. In such applications, the drill bit may be guided by a bushing or the like. In applications such as transfer drilling, the drill bit may be guided by a hole in a component for which a matching hole in a mating component is to be drilled. To maximize precision, the spacing between the drill bit and the guiding means (e.g., bushing or guide hole) should be minimized. This, however, leads to greater friction between the drill bit and the guiding means and thus to increased heat generation. Heat degrades the life of the drill and promotes chip compaction.

A need therefore exists for a drilling system that provides effective chip removal for problematic materials, such as CFRPs, while promoting drill bit longevity and precision.

SUMMARY OF THE INVENTION

In an exemplary embodiment, the present invention provides an improved vacuum drill bit having a plurality of grooves arranged axially along the outer surface of the drill bit body. The improved drill bit of the present invention can be used in an exemplary drilling system of the present invention in which the drill bit is guided by a bushing, with minimal spacing between the bushing and the drill bit body. The grooves act to minimize the friction between the drill bit and the bushing and provide air flow for improved heat dissipation and chip removal.

The drill bit of the present invention can also be used advantageously in transfer drilling applications in which a hole in one part can be used to guide the drilling of a hole in a mating part. By minimizing the friction between the drill bit body and the guiding part, the aforementioned grooves allow the clearance between the drill bit body and the guide hole to be minimized, thus maximizing the precision of the hole transfer, while promoting heat dissipation and chip removal.

These and other features and advantages of the present invention will be apparent to those of skill in the art in view of the following written description and drawings.

BRIEF DESCRIPTION OF THE DRAWINGS

FIG. 1A shows an exemplary embodiment of a vacuum drilling system in accordance with the present invention. FIG. 1B shows a section I-I of the drilling system of FIG. 1A.

DETAILED DESCRIPTION

Figure 2A:
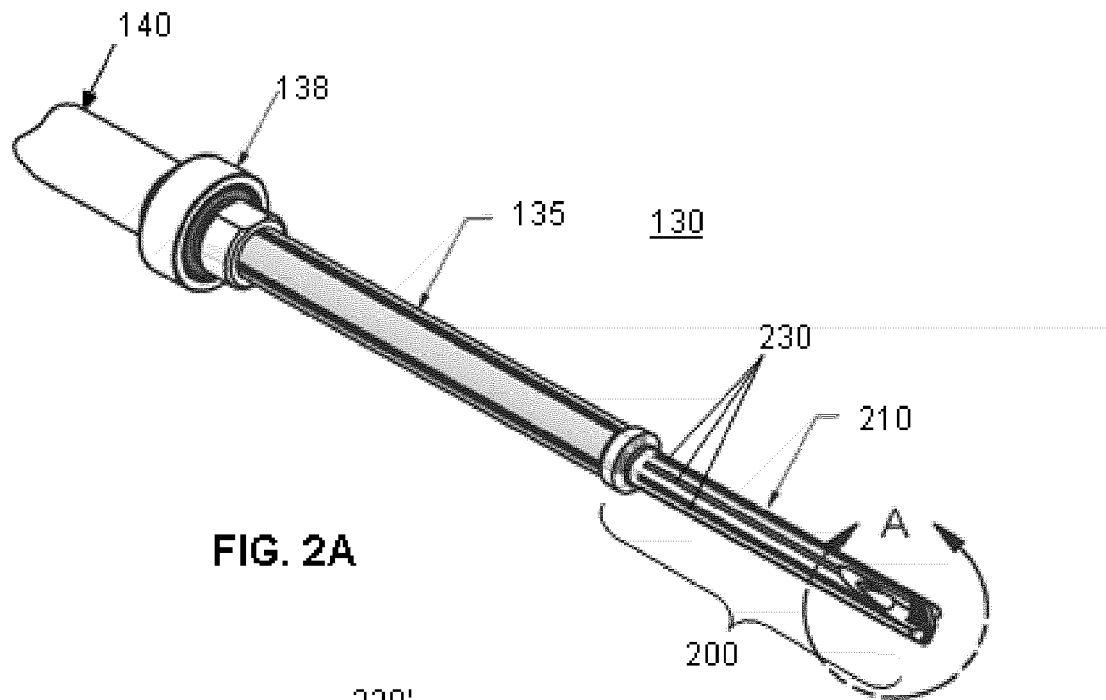
FIG. 2A is an isometric view of a spindle assembly and drill bit of the drilling system of FIG. 1A.

An exemplary embodiment of a vacuum drilling system 100 in accordance with the present invention is shown in FIG. 1A. A cross section I-I of the system 100 is shown in FIG. 1B. The basic configuration of the drilling system 100 is conventional, the major components thereof comprising a motor assembly 110, a nosepiece assembly 120 and a spindle assembly 130. The spindle assembly 130 is also shown isometrically, in isolation, in FIG. 2A. The spindle assembly 130 comprises a spindle 135 and a drill bit 200 coupled to one end of the spindle 135 and in axial alignment therewith. The drill bit 200 is preferably removably coupled to the spindle 135, such as by complementary threads or other suitable coupling, to allow replacement of the drill bit 200.

When the drilling system 100 is in its assembled state, the spindle assembly 130 is seated in the nosepiece assembly 120 and is radially secured thereby. The spindle assembly 130 can rotate about its axis relative to the nosepiece assembly 120 and can also move up and down along its axis relative to the nosepiece assembly 120 thereby extending or retracting the drill bit 200 from the drilling system. In operation, the motor assembly 100 drives the spindle 135 to rotate thus causing the drill bit 200 to rotate as well. As the drilling proceeds, the drill bit 200 can be advanced into the workpiece by moving the spindle assembly down relative to the nosepiece assembly. As will be apparent from the following description, the present invention is not limited to the exemplary drill system configuration described herein and to the particulars thereof and can be readily applied to a variety of systems and applications.

The drill bit 200 and the spindle 135 are generally hollow and their interiors are in fluid communication with each other. The interior of the drill bit 200 is also in fluid communication with one or more openings in the drill bit proximate to cutting features of the drill bit, described more fully below. The opposite, or distal, end of the spindle 135 can be fitted with a hose coupling 138 for coupling to a vacuum hose 140. The hose coupling 138 allows the spindle 135 to rotate relative to the vacuum hose 140 while maintaining a substantially airtight coupling therebetween. A vacuum can thus be applied via the hose 140, through the interiors of the spindle 135 and the drill bit 200 to an area proximate to the cutting features of the drill to thereby draw chips away from the cutting features of the drill. The vacuum source can be a conventional vacuum source familiar in the art, preferably capable of providing at least approximately 3" Hg of vacuum with an airflow of 1 standard cubic feet per minute (SCFM) to 7.5" Hg of vacuum with an airflow of 5 SCFM.

The drill bit 200 will now be described in greater detail with reference to FIGS. 2A and 2B. FIG. 2B is an enlarged view of a first end of the drill bit, which will be referred to as the proximal end. As shown, the drill bit 200 has a generally cylindrical body 210 which is generally hollow; i.e., the drill body 210 comprises an interior chamber 215 which extends from the distal end of the drill bit, axially along at least a portion of the drill body. The distal end of the drill bit 200 is adapted for coupling to the spindle 135, as described above, and the interior chamber 215 of the drill bit is in fluid communication with an interior chamber of the spindle 135 when the spindle 135 and the drill bit 200 are coupled together.

In the exemplary embodiment shown, the drill bit 200 is configured at its proximal end to receive a cutting insert 300. The cutting insert 300 can be a conventional component and can be attached to the drill bit 200 by any appropriate means known in the art, such as by screws, welding, brazing or the like. The exemplary insert 300 shown is generally flat and has two cutting surfaces, although inserts with one or more than two cutting surfaces can also be used within the scope of the present invention. In alternate embodiments, instead of or in addition to a cutting insert 300, the drill bit 200 may have cutting features that are integral with the drill bit body.

As shown in FIG. 2B, a first relief 221 is provided on a first side of the drill bit 200 and a second relief 222 is provided on the drill bit diametrically opposite the first relief. The reliefs 221 and 222 start at the proximal end of the drill bit, in radial alignment with the cutting surfaces of the insert 300, and extend partially up the body 210 of the drill bit. The reliefs 221, 222 are deepest and widest at the proximal end of the drill bit and taper in depth and width as they extend distally along the drill bit body 210. The reliefs 221 and 222 are in fluid communication with the interior chamber 215 of the drill bit 200 via openings 225 and 226, respectively.

In operation, as the workpiece is cut by the cutting surfaces of the insert 300 (and/or of the drill bit) the chips that are formed thereby are drawn by vacuum into the interior chamber 215 via the reliefs 221 and 222 and the openings 225 and 226. The reliefs 221, 222 and the openings 225, 226 as well as the diameter of the interior chamber 215 are preferably sized to accommodate the largest expected chips so as avoid blockage. The edges 225a and 226a of the openings 225, 226 are preferably smoothed or radiused for improved air and chip flow.

The number of reliefs 221, 222 and openings 225, 226 preferably corresponds to the number of cutting surfaces of the insert 300 (or of the drill bit).

Figure 2B:
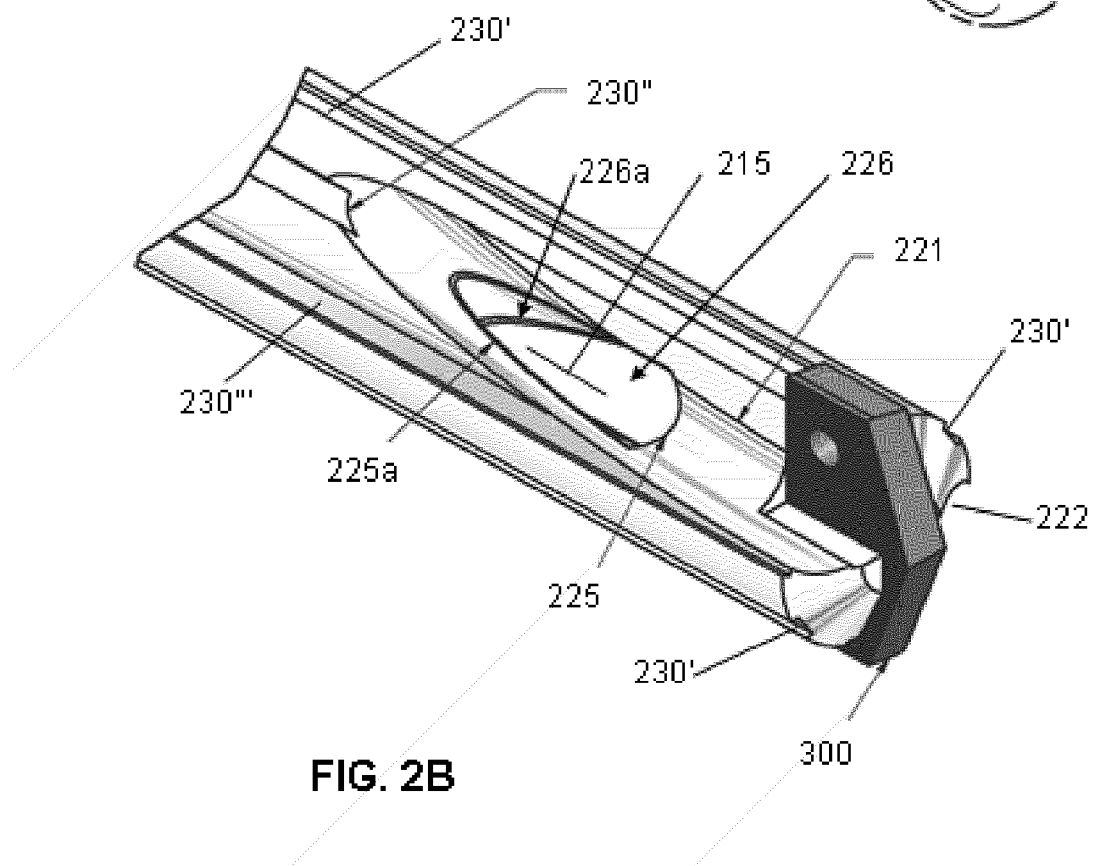
FIG. 2B is an enlarged view of a first end of the drill bit shown in FIG. 2A.

As shown in FIGS. 2A and 2B, the drill bit 200 is provided with a plurality of grooves 230 on the outer surface of its body. In the exemplary embodiment shown, each of the grooves 230 is generally straight and parallel to the axis of the drill bit 200 and has a generally rectangular cross-section. The exemplary drill bit shown has eight grooves 230 that are spaced uniformly radially (i.e., at 45 degree intervals) around the circumference of the drill body.

As shown in FIG. 2B, some of the grooves 230 (designated 230') may extend all the way to the proximal end of the drill bit, whereas some of the grooves 230 (designated 203") may open into the reliefs 221 and 222 and be in fluid communication therewith. Some grooves (designated 230''') may extend all the way to the proximal end of the drill bit while also partially opening into the reliefs 221, 222. A drill bit 200 in accordance with the present invention may have any combination of grooves 230', 230" and 230'''.

The radial extent (i.e., width), spacing and number of grooves 230 can vary. Preferably, there are at least two grooves 230 and the sum of the widths of the grooves 230 is approximately 25% to 75% of the drill bit body 210 circumference.

Moreover, the grooves need not be straight or parallel to the axis of the drill. For example, the grooves can be wound helically around the drill bit body outer surface or may have a zig-zag pattern.

The cross-sections of the grooves 230 can also vary within the scope of the present invention, and may be, for example, semi-circular, V-shaped, or trapezoidal.

When the drilling system 100 is in its assembled state, as shown in FIGS. 1A and 1B, the spindle assembly 130 is seated in the nosepiece assembly 120, with the drill bit 200 being guided by a bushing 125 at the bottom end of the nosepiece assembly. For maximum precision in guiding the drill bit 200, any spacing between the bushing 125 and the drill bit body 210 should be minimized. This, however, leads to greater friction and heat generation as the drill bit 200 rotates relative to the bushing 125. The above-described grooves 230 on the drill bit serve to reduce the friction between the drill bit 200 and the bushing 125, thereby reducing heat generation. In addition, the grooves 230 allow air to flow therethrough which can provide cooling as well improved chip collection, as described more fully below.

In a preferred embodiment, the nosepiece assembly 120 can be adapted to promote cooling and chip collection. As shown in FIGS. 1A and 1B, the nosepiece assembly comprises a collar 126 which co-axially surrounds the drill bit 200 and a lower portion of the spindle 135 when the drill is extended. The bushing 125 is attached to the lower end of the collar 126. The inner diameter of the collar 126 is greater than the outer diameter of the drill bit 200 body, thus providing a chamber 127 therebetween. Additionally, the collar 126 is provided with one or more openings 126a that allow air to flow into or out of the chamber 127. Air drawn through the openings 126a into the chamber 127 can help to cool the drill bit 200 and the bushing 125.

In yet a further aspect of the present invention, as shown in FIGS. 1A and 1B, a jacket component 128 surrounds the collar 126 and provides a path for air to flow from an inlet 128a of the jacket component, via one or more of the openings 126a, to the chamber 127. The inlet 128a can be coupled via a hose to an air source (not shown). Air from the air source can then flow into the chamber 127 and then down the drill bit 200, via the grooves 230. Some of the air will flow via grooves 230" and 230''' past the bushing 125 (depending on the vertical position of the spindle assembly 130), into the reliefs 221, 222 and through the openings 225, 226, where it is drawn by the vacuum into the interior chamber 215 of the drill bit. Some of the air will flow via grooves 230' and 230''' all the way down to the proximal end of the drill bit.

In addition to providing cooling, the flow of air via the grooves 230 may also assist in the chip collection process. In an exemplary embodiment, the pressure of the air supplied via the jacket component 128 is lower than the pressure of the vacuum applied via the openings 225, 226 and is, for example, approximately 10-20 psi. The air source is also preferably a cold air source to further promote cooling of the drilling system 100.

The drilling system 100 of the present invention can also be used for performing transfer drilling. For such an application, the width of the cutting insert 300 or of the cutting portion of the drill bit, in the case of integral cutting features, should be substantially equal to the diameter of the drill bit body 210 to minimize the space between the guiding hole and the drill bit body 210 (after the cutting features have passed through the guiding hole). As in the case of the bushing 125 described above, the grooves 230 on the drill bit body 210 reduce the friction between the drill bit body 210 and the guide hole. Moreover, the grooves 230 can provide air flow to the guide hole and the workpiece. As such, the present invention allows accurate transfer drilling along with the cooling and chip collection advantages described above.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A drill bit comprising:
   a generally cylindrical body having an interior chamber extending axially along at least a portion of the body, the interior chamber being in fluid communication with a first opening at a distal end of the body and with at least one second opening proximate to a proximal end of the body, the at least one second opening extending through a side wall of the body from an outer surface thereof to the interior chamber,
   a plurality of grooves arranged on the outer surface of the body, at least one of the plurality of grooves being in fluid communication with the at least one second opening,
   the proximal end of the body configured to receive a cutting insert, the cutting insert having at least one cutting surface, and the body having a corresponding second opening for each at least one cutting surface, and
   a relief on the body for each cutting surface, each relief starting at the proximal end of the body and extending distally along the body, and each relief being in fluid communication with the corresponding second opening for each at least one cutting surface.

2. The drill bit of claim 1, wherein each of the plurality of grooves is substantially parallel to an axis of the body.

3. The drill bit of claim 1, wherein a ratio of a combined radial extent of the plurality of grooves to a circumference of the outer surface of the body is between 0.25 and 0.75.

4. The drill bit of claim 1, wherein each of the plurality of grooves has a substantially rectangular cross section.

5. The drill bit of claim 1, wherein the cutting insert has a diameter greater than a diameter of the body.

6. A drill system comprising:
   a drill bit including a generally cylindrical body having an interior chamber extending axially along at least a portion of the body, the interior chamber being in fluid communication with a first opening at a distal end of the body and with at least one second opening proximate to a proximal end of the body, the at least one second opening extending through a side wall of the body from an outer surface thereof to the interior chamber,
   a plurality of grooves arranged on the outer surface of the body, at least one of the plurality of grooves being in fluid communication with the at least one second opening;
   a bushing having a generally cylindrical opening for receiving the body therethrough, wherein at least one of the plurality of grooves is adjacent to the bushing when the body is in the generally cylindrical opening,
   the proximal end of the body configured to receive a-cutting insert, the cutting insert having at least one cutting surface, and the body having a corresponding second opening for each at least one cutting surface, and
   a relief on the body for each cutting surface, each relief starting at the proximal end of the body and extending distally along the body, and each relief being in fluid communication with the corresponding second opening for each at least one cutting surface.

7. The drill system of claim 6 comprising:
   a collar, wherein the bushing is attached to a proximal end of the collar and the collar is co-axial with the drill bit when the drill bit is in the generally cylindrical opening, the collar having an inner diameter larger than an outer diameter of the body and at least one collar opening.

8. The drill system of claim 7 comprising:
   a jacket generally surrounding the collar and including an inlet in fluid communication with the at least one collar opening.

9. The drill system of claim 8, wherein the inlet is coupled to a source of air, whereby the air flows through the at least one collar opening and through the plurality of grooves.

10. The drill system of claim 6 comprising:
    a substantially hollow spindle coupled at a proximal end of the spindle to the distal end of the body, wherein an interior chamber of the spindle is in fluid communication with the interior chamber of the body, the interior chamber of the spindle being in fluid communication with an opening at a distal end of the spindle, whereby a vacuum applied to the opening at the distal end of the spindle is conveyed via the interior chamber of the spindle and the interior chamber of the cylindrical body to the at least one second opening.

11. The drill system of claim 6, wherein each of the plurality of grooves is substantially parallel to an axis of the body.

12. The drill system of claim 6, wherein a ratio of a combined radial extent of the plurality of grooves to a circumference of the outer surface of the body is between 0.25 and 0.75.

13. The drill system of claim 6, wherein each of the plurality of grooves has a substantially rectangular cross section.

14. The drill system of claim 6, wherein the cutting insert has a diameter greater than a diameter of the body.

15. The drill bit of claim 1, wherein each relief tapers in depth and width as the relief extends distally along the body from the proximal end of the body to the corresponding second opening.

16. The drilll bit of claim 1, wherein each relief is in radial alignment with a corresponding cutting surface at the proximal end of the body.

17. The drill bit of claim 1, wherein the at least one cutting surface comprises two cutting surfaces, the at least one second opening comprises two second openings, and the body comprises two reliefs.

18. The drill system of claim 6, wherein each relief tapers in depth and width as the relief extends distally along the body from the proximal end of the body to the corresponding second opening.

19. The drill system of claim 6, wherein each relief is in radial alignment with a corresponding cutting surface at the proximal end of the body.

20. The drill system of claim 6, wherein the at least one cutting surface comprises two cutting surfaces, the at least one second opening comprises two second openings, and the body comprises two reliefs.

* * * * *